United States Patent
Boehmke

[15] 3,674,835
[45] July 4, 1972

[54] PROCESS FOR THE PRODUCTION OF GLYCOL ESTERS OF CARBOXYLIC ACIDS

[72] Inventor: Günther Boehmke, Leverkusen-Steinbuechel, Germany

[73] Assignee: Farbenfabriken Bayer Aktiengesellschaft, Leverkusen, Germany

[22] Filed: Feb. 14, 1968

[21] Appl. No.: 705,310

[30] Foreign Application Priority Data

Feb. 24, 1967 Germany..............................E 51628

[52] U.S. Cl. .......................260/473 R, 260/410.6, 260/470, 260/471 R, 260/473 S, 260/475 P, 260/476 R, 260/485 G, 260/486 B, 260/496
[51] Int. Cl............................................................C07c 69/00
[58] Field of Search..............260/473, 475 P, 473 RS, 147 R, 260/475 P, 486 B, 485 G, 485 R, 496, 469, 470, 405.5, 410, 474, 471 R

[56] References Cited

UNITED STATES PATENTS 3,101,366 8/1963 Vaitekunas et al.................260/475 P
1,817,425 8/1931 Steimmig et al......................260/496

*Primary Examiner*—Lorraine A. Weinberger
*Assistant Examiner*—John F. Terapane
*Attorney*—Plumley, Tyner & Sandt

[57] ABSTRACT

The invention relates to a process for the production of glycol esters of carboxylic acids by reaction of a water-soluble alkylene oxide with an aqueous solution of an alkali metal or alkaline earth metal salt of a carboxylic acid at a pH value of from 6 to 10, the inorganic base liberated during the reaction being neutralized continuously.

6 Claims, No Drawings

PROCESS FOR THE PRODUCTION OF GLYCOL ESTERS OF CARBOXYLIC ACIDS

The invention relates to a process for the production of glycol esters of carboxylic acids.

It is known that glycol esters can be produced from carboxylic acids by reaction with alkylene oxides [see, for example, Houben-Weyl, Methoden der organischen Chemie, 4th Edition (1952), Vol. VIII/3, pp. 531–532]. Recent investigations have shown, however, that this reaction is accompanied by the formation of diesters and free glycols [see, for example, N. Schönfeldt, Oberflachenaktive Produkte des Athylenoxids, Stuttgart (1959), page 57, and A. N. Wrigley et al, Journal American Oil Chemist (1959), Vol. 36, page 34]. According to the last-mentioned of these works, only 32 percent of ethylene glycol mono-oleate are obtained when 1 mol of oleic acid and 1 mol of ethylene oxide are used. In addition, it has already been proposed to react dicarboxylic acids with ethylene oxide in aqueous suspension in the presence of pyridine (German Patent No. 905,736). In this process, however, the glycol esters formed have to be soluble in water because, with insoluble compounds, the reaction velocities are far too low.

It is an object of this invention to provide a process for the production of glycol esters of carboxylic acids which comprises reacting a water-soluble alkylene oxide, in aqueous medium, with an aqueous solution of an alkali metal or alkaline earth metal salt of a carboxylic acid of the formula $$R-(COOH)_n$$

wherein $n$ represents 1 or 2, and R represents a saturated or unsaturated alkyl or alkylene radical or an unsubstituted or substituted aryl or arylene radical, and isolating the glycol ester that is formed, said reacting being effected at a temperature in the range from about 5° to about 100° C and at a pH-value in the range from about 6 to about 10, the inorganic base liberated during the reaction being neutralized continuously by the addition of a dilute inorganic acid.

Preferred alkylene oxides for the process according to the invention include ethylene oxide, propylene oxide and butylene oxide.

In this context, saturated or unsaturated alkyl or alkylene radicals R are those containing from 2 to 10 and preferably from 2 to 6 carbon atoms. Preferred unsubstituted or substituted aryl or arylene radicals R are those of the kind containing up to 10 carbon atoms in the ring system; two of such arylene radicals may be attached to each other directly through a carbon-carbon bond, or through an oxygen or sulfur atom, or through a methylene bridge.

Preferred substituents in the aryl or arylene radical include halogen atoms (fluorine, chlorine or bromine), nitro groups, alkyl-, alkoxy-, or hydroxyalkoxy groups each having up to 4 carbon atoms, and an OH-group in the ortho position.

The following are specific examples of suitable carboxylic acids: benzoic acid; salicylic acid; ether carboxylic acids such as p-hydroxyethoxy-benzene carboxylic acid; and aliphatic or aromatic dicarboxylic acids such as adipic acid, maleic acid, phthalic acid and terephthalic acid.

NaOH, KOH, $Ca(OH)_2$ are preferably used as the alkali metal or alkaline-earth metal hydroxides for the process according to the invention. The reaction is carried out at a temperature in the range from about 5° to about 100° C and preferably in the range from 40° to 80° C.

It is really surprising that esters can be produced in almost quantitative yields from the alkaline-reacting aqueous solutions of alkali metal or alkaline earth metal salts of carboxylic acids because esters are known to be readily hydrolyzed in aqueous solution, particularly in alkaline medium. The possibility of using the aqueous solution is of considerable industrial interest so far as a number of acids are concerned, for example, p-hydroxybenzoic acid or terephthalic acid, because during their preparation they are obtained in the form of their alkali-metal salts.

Another advantage of using alkali metal salt solutions is that they enable the reaction to be carried out in high concentration in homogeneous solution, provide high reaction velocities and also enable the reaction to be carried out smoothly both in a continuous cycle and in large batches.

The solutions of alkali-metal salts or, alternatively, alkaline earth metal salts preferably used for the process according to the invention are obtained by normal methods. In the preferred case of alkali metal salts, solutions thereof are formed during preparation of the carboxylic acid. If these solutions have a pH-value outside the range from about 6 to about 10, preferably from pH 7 to pH 9, the pH is brought within this range by the addition of an acid or alkali. The alkylene oxide is introduced at a temperature in the range from about 5° to about 100° C, preferably in the range from 40° to 80° C. After a short time, there is a distinct rise in the pH-value. Thereafter, the pH-value is kept within the range from about 7 to about 9 by adding the requisite quantity of an inorganic acid (preferably aqueous sulfuric acid; or aqueous hydrochloric acid when calcium hydroxide is used as the base). The correct pH-value is checked by continuous measurement with a pH-meter and by adding the requisite quantity of acid.

The relative quantities in which the reactants are used for the reaction are such that the stoichiometrically necessary quantity of alkylene oxide is present for each carboxy group. If desired, the alkylene oxide may also be used in an excess of up to about 10 percent by weight.

If the pH-value is neither checked nor adjusted during the esterification reaction, it will rise quickly to a value between 12 and 14 when the alkylene oxide is introduced into the salt solution. The alkali metal or alkaline earth metal that is liberated will promote hydrolysis of the glycol ester formed, in a secondary reaction, with the result that, on completion of the reaction, the alkylene oxide introduced is found in the form of the corresponding alkylene glycol, accompanied by unchanged alkali metal or alkaline earth metal salt of the carboxylic acid.

The method used to work up the reaction mixtures obtained by the process according to the invention will depend upon the solubility in water of the glycol ester formed and upon its melting point. In the case of adipic acid, it is of advantage, for example, to separate the diester of the glycol from the salt solution formed by adding a solvent such as butanol which is then distilled off in vacuo. The p-hydroxyethoxy benzoic acid glycol ester is quantitatively separated at temperatures as low as 60° C in the form of an oily liquid for example from the salt solution, and may readily be isolated in this form.

The process according to the invention may be applied with particular advantage in instances where the starting products are actually formed as alkali metal salts during their synthesis.

The glycol esters obtainable by the process according to the invention are intermediate products for the manufacture of plastics.

The following examples are to further illustrate the invention without limiting it.

EXAMPLE 1

300 g of adipic acid are suspended in 200 g of water. Complete dissolution is obtained by the addition of 160 g of 50 percent by weight aqueous sodium hydroxide, which also produces an increase in the pH-value to 6. A solution of the monosodium salt is thus obtained. 90 g of ethylene oxide are introduced with stirring into this solution at a temperature of 50° C, resulting in the formation of the monoglycol ester of adipic acid which if desired may be isolated. There is only a slight change in the pH-value from 7 to 7.5. During the introduction of another 90 g of ethylene oxide, the pH-value is kept in the range from 8 to 8.5 by the simultaneous addition of 300 g of 33 percent by weight aqueous sulfuric acid. Measurement is continuously carried out by means of an electric pH-meter connected to an electrode dipping into the reaction solution. After all the ethylene oxide has been introduced, the pH-value is adjusted to 7 and the reaction solution is stirred with 400 g of butanol. The butanol solution is then separated off and the butanol, together with the water is distilled off in vacuo. 455 g of (95 percent of the theoretical) of colorless adipic acid glycol diester corresponding to the formula

HOCH$_2$—CH$_2$—OOC—(CH$_2$)$_4$—COOCH$_2$—CH$_2$—$_{OH}$ $n_D^{20}$= 1.4616, are obtained.

EXAMPLE 2

166 g of terephthalic acid are suspended in 350 g of water and converted into the monosodium salt by the addition of 80 g of 50 percent by weight aqueous sodium hydroxide at 50° to 80° C. 44 to 46 g of ethylene oxide are introduced with stirring, which produces an increase in the pH-value from 6.0 to 8.5–9.0. The pH-value is kept in the range from 8 to 8.5 by the addition of another 44 g of ethylene oxide and the simultaneous dropwise addition of 150 g of 33 percent by weight aqueous sulfuric acid. After the ethylene oxide has been added, the ester corresponding to the formula

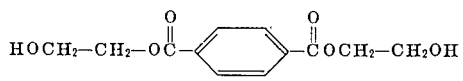

is isolated. Yield = 94 percent of the theoretical, m.p. 110° C.

EXAMPLE 3

138 g of p-hydroxyethoxy benzoic acid (m.p. 173° C) are suspended in 138 g of water and dissolved by the addition of 80 g of 50 percent by weight aqueous sodium hydroxide. The pH-value is now 7.8. 44 g of ethylene oxide are introduced at 50° C. At the same time, 150 g of 33 percent by weight aqueous sulfuric acid are added dropwise. Addition of the acid is regulated in dependence upon the electrically determined pH-value in such a way that a pH of 8 to 8.5 is maintained during the reaction. On completion of the reaction, the pH is adjusted to within the range from 6 to 7 with a little acetic acid. After stirring of the reaction mixture has been stopped, the organic layer separates from the sodium sulfate solution. It is removed, dried in vacuo and suction-filtered under heat through Fuller's Earth. The highly viscous colorless glycol ester of p-hydroxyethoxy benzoic acid is obtained in the filtrate in a yield of 645 g. On standing, it gradually crystallizes and then melts at 70° to 73° C. Following recrystallization from benzene/acetone, its melting point is 71° to 73° C.

What I claim is:

1. The process for the production of glycol esters of carboxylic acids which comprises reacting a water-soluble alkylene oxide having a vicinal epoxy group, in an aqueous medium, with an aqueous solution of an alkali metal or alkaline earth metal salt of a carboxylic acid of the formula R—(COOH)$_n$ wherein
   $n$ is 1 or 2;
   R is an aliphatic hydrocarbon having two to 10 carbon atoms; aryl or arylene containing up to 10 carbon atoms; two of said aryl or arylene groups attached to each other directly through a C—C—, —O—, —S—, or methylene bridge, or said aryl or arylene substituted with F; Cl; Br; nitro; alkyl-, alkoxy-, or hydroxy alkoxy having up to four carbon atoms; or ortho hydroxy;
   said alkylene oxide being present in an amount ranging from that stoichiometrically necessary to react with the carboxyl groups of said carboxylic acid up to an excess of 10% by weight;
   said reacting being effected at a temperature in the range of from about 5 to about 100°C and at a pH of about 6 to about 10, the inorganic base liberated during the reaction being neutralized continuously by the addition of a dilute inorganic acid.

2. The process of claim 1 wherein said alkylene oxide having a vicinal epoxy group is ethylene oxide.

3. The process of claim 1 wherein said alkali metal or alkaline earth metal salt of a carboxylic acid is the sodium, potassium or calcium salt of a carboxylic acid.

4. The process of claim 1 wherein said carboxylic acid is benzoic acid, salicylic acid, p-hydroxyethoxy-benzene carboxylic acid; adipic acid, maleic acid, phthalic acid or terephthalic acid.

5. The process of claim 1 conducted at a temperature of 40° to 80° C.

6. The process of claim 1 wherein aqueous sulfuric or aqueous hydrochloric acid is the dilute inorganic acid used for neutralization.

* * * * *